(12) United States Patent
Askan

(10) Patent No.: US 11,374,391 B2
(45) Date of Patent: Jun. 28, 2022

(54) ELECTRICAL AC/DC CONVERTER ARRANGEMENT WITH AN AC CIRCUIT BREAKER, AND A METHOD FOR DISCONNECTING AN AC/DC CONVERTER ARRANGEMENT

(71) Applicant: Eaton Intelligent Power Limited, Dublin (IE)

(72) Inventor: Kenan Askan, Vienna (AT)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 17/291,285

(22) PCT Filed: Oct. 31, 2019

(86) PCT No.: PCT/EP2019/079913
§ 371 (c)(1),
(2) Date: May 5, 2021

(87) PCT Pub. No.: WO2020/094508
PCT Pub. Date: May 14, 2020

(65) Prior Publication Data
US 2022/0006375 A1 Jan. 6, 2022

(30) Foreign Application Priority Data
Nov. 9, 2018 (DE) ...................... 10 2018 128 121.8

(51) Int. Cl.
*H02H 3/02* (2006.01)
*H02H 7/125* (2006.01)
(Continued)

(52) U.S. Cl.
CPC .......... *H02H 3/023* (2013.01); *H02H 7/1227* (2013.01); *H02H 7/1257* (2013.01); *H02M 1/325* (2021.05); *H02M 7/219* (2013.01)

(58) Field of Classification Search
CPC ........ H02H 1/04; H02H 3/021; H02H 7/1257; H02H 7/26; H02H 9/007; H02H 9/028; H02M 7/219; H02M 7/217; H02M 1/32
See application file for complete search history.

(56) References Cited

U.S. PATENT DOCUMENTS

| 5,111,014 A | * | 5/1992 | Tanaka | H05B 6/062 |
| | | | | 219/626 |
| 8,963,442 B2 | * | 2/2015 | Ribarich | H05B 45/382 |
| | | | | 315/250 |

(Continued)

FOREIGN PATENT DOCUMENTS

| FR | 2770942 A1 | * | 5/1999 | ............ H02M 7/217 |
| GB | 2517742 A | * | 3/2015 | ............... H02H 3/08 |

(Continued)

*Primary Examiner* — Gustavo A Rosario-Benitez
(74) *Attorney, Agent, or Firm* — Leydig, Voit & Mayer, Ltd.

(57) ABSTRACT

An electrical AC/DC converter arrangement includes: an AC circuit breaker; a rectifier; at least one smoothing capacitor; at least one first isolating relay for electrical isolation; at least one first current sensor; and a control and monitoring unit. An input of the AC circuit breaker forms an AC input of the arrangement. An output of the AC circuit breaker is connected, at least indirectly by a circuit, to an input of the rectifier. The at least one smoothing capacitor connects a first output of the rectifier to a second output of the rectifier. The first output of the rectifier is connected, at least indirectly by a circuit, to an input of the at least one first isolating relay. An output of the at least one first isolating relay forms a first DC output of the arrangement and connects a DC network to at least one first DC load.

11 Claims, 2 Drawing Sheets

(51) Int. Cl.
*H02M 1/32* (2007.01)
*H02M 7/219* (2006.01)
*H02H 7/122* (2006.01)

(56) References Cited

U.S. PATENT DOCUMENTS

| | | | |
|---|---|---|---|
| 2004/0264088 A1* | 12/2004 | Hooper | H02H 3/24 |
| | | | 361/92 |
| 2013/0154774 A1 | 6/2013 | Bhavaraju et al. | |
| 2014/0078622 A1* | 3/2014 | Crane | H02H 3/087 |
| | | | 361/8 |
| 2014/0268942 A1 | 9/2014 | Jiang Häfner | |
| 2014/0300274 A1* | 10/2014 | Acatrinei | H05B 45/50 |
| | | | 315/122 |
| 2016/0203932 A1* | 7/2016 | Niehoff | H02H 3/025 |
| | | | 361/170 |
| 2017/0163170 A1* | 6/2017 | Tahata | H02J 5/00 |
| 2017/0269139 A1* | 9/2017 | Schmalz | H02H 1/0015 |
| 2017/0297861 A1* | 10/2017 | Nakari | B66B 25/00 |
| 2017/0306928 A1 | 10/2017 | Kamei et al. | |
| 2018/0026550 A1* | 1/2018 | Dent | H02M 7/537 |
| | | | 363/56.01 |
| 2018/0294711 A1* | 10/2018 | Yoshida | H02M 1/32 |
| 2018/0301931 A1* | 10/2018 | Hsia | H02M 7/217 |
| 2020/0044577 A1* | 2/2020 | Shikagawa | H02P 27/06 |
| 2021/0175704 A1* | 6/2021 | Askan | H02H 3/087 |

FOREIGN PATENT DOCUMENTS

| | | |
|---|---|---|
| JP | H 089647 A | 1/1996 |
| JP | 2009046231 A | 3/2009 |
| WO | WO 2015028634 A1 | 3/2015 |

* cited by examiner

— 1 —

ELECTRICAL AC/DC CONVERTER ARRANGEMENT WITH AN AC CIRCUIT BREAKER, AND A METHOD FOR DISCONNECTING AN AC/DC CONVERTER ARRANGEMENT

CROSS-REFERENCE TO PRIOR APPLICATIONS

This application is a U.S. National Phase application under 35 U.S.C. § 371 of International Application No. PCT/EP2019/079913, filed on Oct. 31, 2019, and claims benefit to German Patent Application No. DE 10 2018 128 121.8, filed on Nov. 9, 2018. The International Application was published in English on May 14, 2020 as WO 2020/094508 under PCT Article 21(2).

FIELD

The invention relates to an electrical AC/DC converter arrangement.

BACKGROUND

FIG. 1 shows an electrical AC/DC converter arrangement according to the prior art. Said electrical AC/DC converter arrangement is composed of the following, in each case separate components:

an active rectifier 3, which comprises the actual rectifier 21, and a capacitor 4, in particular a so-called capacitor bank, connected to the output of the rectifier 21, input coils 20, which are also referred to as "boost inductance", an electromechanical AC circuit breaker 30 having a typical response time of 5 to 9 ms for short-circuit protection on the AC side in long DC lines, an AC contactor 31 having a typical response time of 20 to 30 ms to ensure electrical isolation and to switch a rated current or an operating current, "fast" fuses 32 for protecting the rectifier 3 or the diodes in the event of a fault between the rectifier 3 and the capacitor bank because both the AC circuit breaker 30 and the AC contactor 31 would be too slow to ensure protection in such a case, an electromechanical DC circuit breaker 34 having a typical response time of 5 to 9 ms for short-circuit protection on the DC side, a DC isolation switch 35 having a typical response time of 20 to 30 ms to ensure electrical isolation.

Furthermore, the installation has an EMC filter 33 and a DC distributor 36 to which different loads can be connected, a further DC circuit breaker 29 being connected to the respective outputs of the DC distributor 36 in each case. The respective components are connected as shown in FIG. 1. Furthermore, the arrangement according to the state of the art has, in each case downstream of the DC circuit breakers 29, a circuit breaker in each case that is not shown in FIG. 1.

As can be seen from this installation, the protection of such systems or installations is very complicated and requires a large number of different, separate devices. In particular, special DC circuit breaking devices and DC power switches are required. Because disconnecting high direct currents is, owing to the lack of zero crossing of the voltage, considerably more difficult than disconnecting alternating currents, correspondingly powerful DC switching devices are, in each case, much more technically complex than comparable AC switching devices. Said DC switching devices are not only more complex in design but also have a larger volume, and are, owing to the increased complexity, also more expensive than comparable AC switching devices.

SUMMARY

In an embodiment, the present invention provides an electrical AC/DC converter arrangement, comprising: an AC circuit breaker; a rectifier; at least one smoothing capacitor; at least one first isolating relay for electrical isolation; at least one first current sensor; and a control and monitoring unit, wherein an input of the AC circuit breaker forms an AC input of the arrangement, wherein an output of the AC circuit breaker is connected, at least indirectly by a circuit, to an input of the rectifier, wherein the at least one smoothing capacitor connects a first output of the rectifier to a second output of the rectifier, wherein the first output of the rectifier is connected, at least indirectly by a circuit, to an input of the at least one first isolating relay, wherein an output of the at least one first isolating relay forms a first DC output of the arrangement and connects a DC network to at least one first DC load, wherein the at least one first current sensor is arranged between the at least one smoothing capacitor and the at least one first isolating relay, wherein the AC circuit breaker, the at least one first current sensor, and the at least one first isolating relay are connected by a controller to the control and monitoring unit, and wherein the control and monitoring unit is configured to initiate a separation of the AC input from the DC output in a first step upon detection of a short-circuit current such that a resonant circuit comprising the at least one smoothing capacitor and an inductance of the DC network connected to the first DC output is excited so as to oscillate, the at least one first isolating relay subsequently being opened.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention provides an electrical AC/DC converter arrangement of the type mentioned at the outset with which the aforementioned disadvantages can be avoided and with which protection of an electrical AC/DC converter arrangement can be ensured simply and with little complexity in terms of the number and type of components required.

As a result, a safe electrical AC/DC converter arrangement can be provided that has significantly fewer components than is the case with known AC/DC converter arrangements. In addition, it is no longer necessary to use special DC switching devices that are able to quench an arc in the case of direct current because the disconnection takes place on the AC side and a zero crossing is generated by the resonance on the DC side, which zero crossing significantly simplifies the additional disconnection on the DC side.

In the subject-matter arrangement, it is possible for the first isolating relay to be designed as a conventional AC isolating relay that has no DC arc quenching device, even though said isolating relay is arranged on the DC side. On the DC side, no special DC switching devices and no automatic switches are required at all anymore.

Furthermore, fuses can be dispensed with on the AC side. On the AC side, the electromechanical AC circuit breaker of the AC power switches as well as the fuses are replaced by a single hybrid or semiconductor circuit breaking device.

In summary, it can therefore be stated that a significantly reduced number of switching devices is required by the subject-matter measures to ensure protection of an electrical AC/DC converter arrangement, no technically complicated and complex DC circuit breakers and DC power switches being required in particular. Furthermore, fuses that are cumbersome to handle can be dispensed with. Because such fuses must be replaced and stored accordingly in the event of a fault, the system availability can be significantly increased merely by the fact that no fuses are required.

The invention further relates to methods of disconnecting a subject-matter electrical AC/DC converter arrangement as described herein.

Reference is hereby expressly made to the wording of the claims, whereby the claims at this point are incorporated by reference into the description and are considered to be reproduced verbatim.

Figure 1:
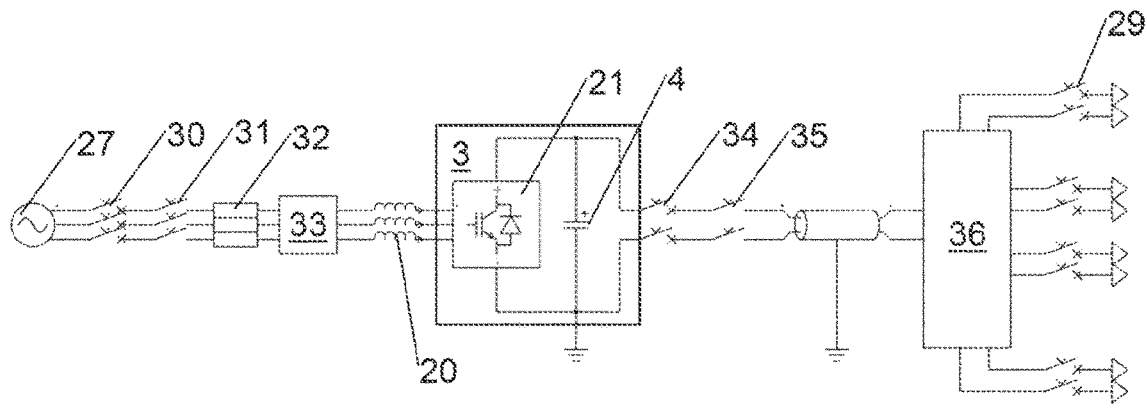
FIG. 1 is a schematic representation of an electrical AC/DC converter arrangement according to the prior art.
Figure 2:
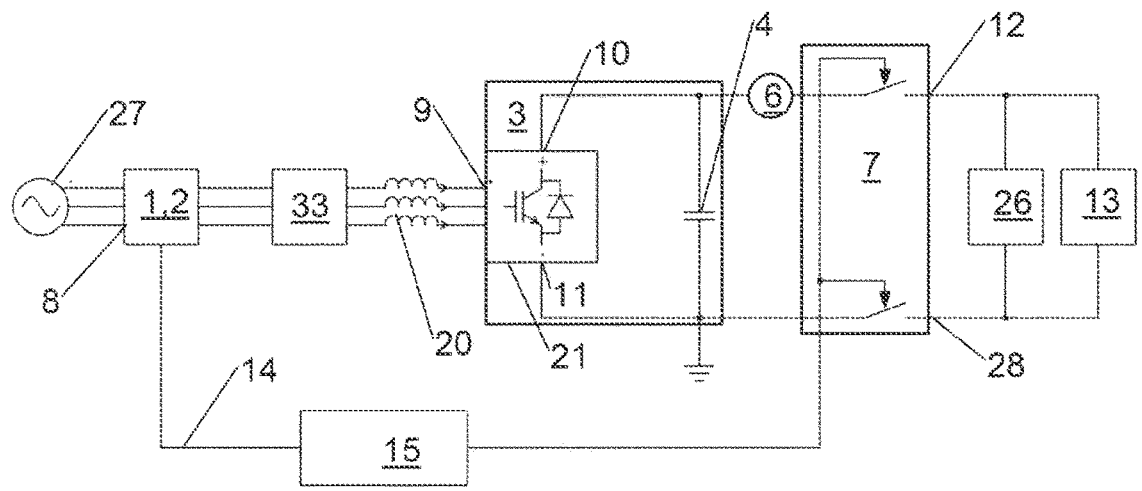
FIG. 2 is a schematic representation of a first embodiment of a subject-matter electrical AC/DC converter arrangement.
Figure 3:
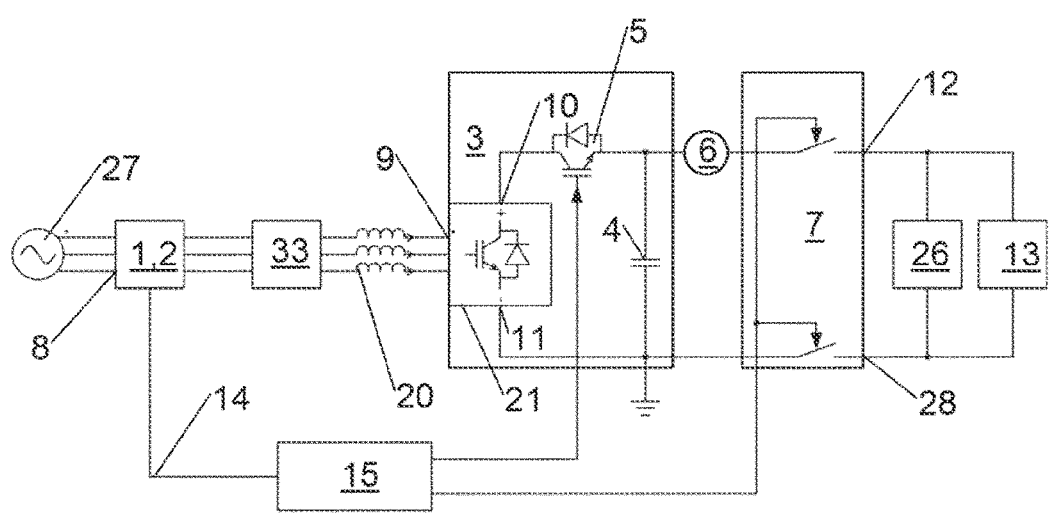
FIG. 3 is a schematic representation of a second embodiment of a subject-matter electrical AC/DC converter arrangement.

FIGS. 2 and 3 each show an electrical AC/DC converter arrangement comprising at least the following components:
 an AC circuit breaker 1, and
 a rectifier 21, and
 at least one smoothing capacitor 4, and
 at least one first isolating relay 7 for electrical isolation, and
 at least one first current sensor 6, and
 a control and monitoring unit 15.

In particular, the subject-matter electrical AC/DC converter arrangement has no further circuit breaking devices on the AC side.

In particular, the subject-matter electrical AC/DC converter arrangement has no special DC circuit breaking devices or so-called automatic circuit breakers on the DC side. Owing to the zero crossing that is lacking in the case of a direct current per se, it is known to be considerably more complicated to quench a disconnection arc in the case of direct current than it is in the case of alternating current. Accordingly, direct current or DC circuit breaking devices are considerably more complex and also larger than corresponding AC circuit breaking devices.

The subject-matter installations shown in the drawings are grounded with a conductor. However, the installations can also be designed without grounding or with a grounded mid-potential.

The AC circuit breaker 1 is in particular a so-called hybrid circuit breaker 2 or a semiconductor circuit breaker. Semiconductor circuit breakers interrupt a current exclusively by means of at least one power semiconductor through which current constantly flows. Hybrid circuit breakers 2 have a parallel circuit consisting of a bypass switch and a power semiconductor circuit, as well as further preferably break contacts for galvanic isolation.

Such a circuit breaking device is known, for example, from WO 2015/028634 A1 of the applicant.

The AC circuit breaker 1 forms the AC input 8 or the AC inputs 8 of the subject-matter installation. The schematic representations depict an AC source 27 is shown that is, in each case, shown as a three-phase source. The specific number of outer conductors of the AC supply, as well as the presence of a neutral conductor are, in concrete terms, non-essential and non-limiting. The AC circuit breaker 1 is to be designed accordingly or a plurality of AC circuit breakers 1 can be provided in parallel.

An output of the AC circuit breaker 1 or the outputs of the AC circuit breaker 1 are connected, at least indirectly by way of a circuit, to an input 9 or inputs of the rectifier 21. In this case, an EMC filter 33 is preferably connected between the AC circuit breaker 1 and the rectifier 21.

The installation has a rectifier 21. The rectifier 21 or the rectifier switching arrangement 21 is preferably designed so as to comprise a predeterminable number of switchable half-bridges, as is known from inverter technology. The rectifier 21 can also be designed differently.

The installation has at least one smoothing capacitor 4 that can, of course, be formed by any number of discrete capacitors 4 that are connected to each other. The smoothing capacitor 4 connects the first output 10 of the rectifier 21 to the second output 11 of the rectifier 21, as shown in FIGS. 2 and 3.

It is preferably provided that the rectifier 21 and the smoothing capacitor 4 together form part of an "active rectifier 3". Such an "active rectifier 3" is also referred to as "an active frontend".

Furthermore, it can be provided that the illustrated input coils 20, which are also referred to as "boost inductance", are designed together with the "active rectifier 3". Such an arrangement is referred to as a "boost converter".

The first isolating relay 7 is provided to ensure electrical isolation. The first output 10 of the rectifier 21 is connected, at least by way of a circuit, to an input of the first isolating relay 7. The rectifier 21 has two outputs of different polarities. It is preferably provided that the first isolating relay 7 has two inputs and two outputs and accordingly also two contact-break distances each having a contact breaker point, as well as that both outputs 10, 11 of the rectifier 21 are connected to the first isolating relay 7, as shown in FIGS. 2 and 3.

In the subject-matter arrangement, it is possible for the first isolating relay 7 to be designed as a conventional AC isolating relay that has no DC arc quenching device, even though said isolating relay is arranged on the DC side.

It should be noted that, according to the first preferred embodiment, no further semiconductor switch is arranged in the connecting lines between the outputs 10, 11 of the rectifier 21 and the first isolating relay 7. The corresponding connections are therefore switchless.

According to the second preferred embodiment, as shown in FIG. 3, it is provided that the arrangement further has a first semiconductor switch 5 that is connected between the first output 10 of the rectifier 21 and the smoothing capacitor 4.

The output 12 or the outputs 12, 18 of the first isolating relay 7 form(s) a first DC output of the arrangement and are provided for connecting a DC network to at least one first DC load 13. No additional DC circuit breaker is required. FIGS. 2 and 3 further show an electrical fault 26 on the DC side.

The installation or arrangement has at least one first current sensor 6 that is arranged between the smoothing capacitor 4 and the isolating relay 7. The first current sensor 6 can also be referred to as a current-measuring arrangement. In this case, the first current sensor 6 serves to detect overcurrents and/or short-circuit currents or to record the current curve after separation from the AC side.

The first current sensor 6 is an AC current sensor and is accordingly capable of detecting currents of negative polarity as well. Furthermore, the first current sensor is preferably not an effective value sensor, but instead measures an instantaneous value of the current.

To control the subject-matter arrangement, it is provided that said arrangement comprises at least one aforementioned control and monitoring unit 15 as a further component. This control and monitoring unit 15 can either be designed as a separate unit or be integrated in one of the other components.

Accordingly, it is provided that the control and monitoring unit 15 is connected, at least indirectly by way of a controller, to the AC circuit breaker 1 and the first current sensor 6 and preferably also connected to the first isolating relay 7. The control and monitoring unit 15 is preferably further connected to the rectifier 21. If the control and monitoring unit 15 is already integrated in one of these components, a connection with this one component is, of course, no longer necessary. In this case, then, one of the components is a master, whereas the other components are corresponding slaves. The relevant control engineering intelligence can be arranged on different components.

The control and monitoring unit 15 is in particular designed to comprise a μC or μP.

In the case of separately designed components, the individual components are preferably connected to the control and monitoring unit 15 by means of a bus 14. This bus 14 can be formed by a number of control lines that are operated at 24 V and 28 V, respectively. However, any other form of bus 14, such as a Modbus or a USB, can be provided. However, a radio connection can also be provided.

As a result, a safe electrical AC/DC converter arrangement can be provided that has significantly fewer components than is the case with known AC/DC converter arrangements. In addition, it is no longer necessary to use special DC switching devices that are able to quench an arc in the case of a direct current because the disconnection takes place on the AC side and a zero crossing is generated by the resonance on the DC side, which zero crossing significantly simplifies the additional disconnection on the DC side.

Furthermore, it is possible to dispense with fuses 32 on the AC side. On the AC side, the electromechanical AC circuit breaker 30 of the AC power switches 31 as well as the fuses 32 are replaced by a hybrid or semiconductor circuit breaking device 2.

In the subject-matter arrangement, it is possible for the first isolating relay 7 to be designed as a conventional AC isolating relay that has no DC arc quenching device, even though said isolating relay is arranged on the DC side. On the DC side, no special DC switching devices and no automatic switches are required at all anymore.

In summary, it can therefore be stated that a significantly reduced number of switching devices is required by the subject-matter measures to ensure protection of an electrical AC/DC converter arrangement, no technically complicated and expensive DC circuit breakers and DC power switches being required in particular. Furthermore, fuses 32 that are cumbersome to handle can be dispensed with. Because such fuses must be replaced and stored accordingly in the event of a fault, the system availability can be significantly increased merely by the fact that no fuses 32 are required. The subject-matter arrangement is therefore designed to be free of fuses.

The subject-matter installation or arrangement is intended to protect a downstream or connected DC network. As explained below, this DC network to be protected is itself relevant to the mode of operation of the device.

When the current sensor 6 detects a predeterminable short-circuit current on the DC side, it is provided that the control and monitoring unit 15 initiates a separation of the AC input 8 from the DC output 12, 28 in a first step.

In the first preferred embodiment according to FIG. 2, the AC input 8 is separated from the DC output 12, 28 by the control and monitoring unit 15, which trips the AC circuit breaker 1 or actuates it accordingly.

As a result, a simple design can be achieved that has particularly low resistance on the DC side. This immediately stops the flow of current.

It has proved to be particularly advantageous if the AC circuit breaker 1 is designed as a hybrid circuit breaker 2 or as a semiconductor circuit breaker.

In any case, this ensures that the separation process takes place so fast that the voltage at the smoothing capacitor 4 is not zero when the separation of the AC input has ended. This is important for producing oscillation on the DC side, as several paragraphs will explain in more detail.

As a further component, the second preferred embodiment according to FIG. 3 has a first semiconductor switch 5 that is arranged between the first output 10 of the rectifier 21 and the smoothing capacitor 4. The AC side can be rapidly separated from the DC side by way of the first semiconductor switch 5, regardless of the respective design of the AC circuit breaker 1.

In any case, it can be ensured that this separation takes place so fast that the oscillation takes place on the DC side. As a result, even if the AC circuit breaker 1 is designed as a "slower" AC circuit breaker 1, the intended mode of operation can be ensured. In this embodiment, the AC circuit breaker 1 can, of course, also be designed as a hybrid circuit breaker 2 or as a semiconductor circuit breaker. The subject-matter arrangement of the first semiconductor switch 5 is substantially more efficient than the arrangement of an SSCB on the DC side. Furthermore, the subject-matter arrangement of the rectifier 21 and the first semiconductor switch 5 makes a bidirectional current flow possible.

The first semiconductor switch 5 is preferably designed as an IGBT or as a MOSFET. When the semiconductor switch 5 is designed as an IGBT, a so-called antiparallel diode is also provided, as shown in FIG. 3. It is also possible for a plurality of parallel-connected first semiconductor switches 5 to be arranged at this location.

In the second preferred embodiment according to FIG. 3, the AC input 8 is separated from the DC output 12, 28 by the control and monitoring unit 15, which disconnects the first semiconductor switch 5 to separate the AC input 8 from the DC output 12, 28.

It is preferably provided that the AC circuit breaker 1 is also switched off, although this is not mandatory.

According to a preferred development, it is further provided in both embodiments that the active switching elements of the rectifier 21 are also disconnected additionally or substantially at the same time that the AC input 8 is separated from the DC output 12, 28. In this case, it is provided in particular that, upon detection of a predeterminable overcurrent or short-circuit current on the DC side, the active switching elements of the rectifier 21 are disconnected first and the AC circuit breaker 1 or the first semiconductor switch 5 are switched off subsequently or substantially simultaneously.

As an alternative to the detection of the overcurrent by means of the first current sensor 6, an overcurrent can also be detected by a drive circuit of the rectifier 21. Furthermore, the rectifier 21, when designed appropriately by means of PWM, can also limit an overcurrent.

By disconnecting the AC input 8 from the DC output 12, 28, a resonant circuit consisting of the capacitance of the smoothing capacitor 4 and the inductance of the DC network connected to the first DC output 12, 28 is excited so as to oscillate. In this case or as a result of this, a decaying alternating current occurs within the DC network. For this purpose, the separation of the AC input must take place as long as the voltage at the smoothing capacitor 4 is not zero. This is always guaranteed per se by the capacitance values of typical smoothing capacitors 4 and the response times of modern electronics. Furthermore, the smoothing capacitor 4 may not be a capacitor having a predetermined polarity, that is, for example, an electrolytic capacitor.

Owing to the lines that are necessarily present, a connected DC network has typical values for its inductance, which can also be referred to as leakage inductance, of between 10 µH and 200 µH. Upon disconnection from the AC side, this results in a current that oscillates at a frequency between 100 Hz and 1000 Hz.

Of course, other oscillation frequencies can occur here. This is an oscillation that has already been excited and whose amplitude decreases due to the decreasing capacitor charge as well as the damping.

The oscillation thereby generated has zero crossings and simplifies the disconnection on the DC side, which is necessary for achieving electrical isolation, which is why the first isolating relay 7 is opened after the AC input 8 is separated from the DC output 12, 28.

Depending on the design of the first isolating relay 7, the first isolating relay 7 is opened or disconnected in different ways or can be opened or disconnected in different ways.

According to a first preferred embodiment of the first isolating relay 7, it is provided that the first isolating relay 7 is designed as an automatic AC circuit breaker, which is preferably electromechanical, comprising a short-circuit release. Such automatic AC circuit breakers having a short-circuit release are, for example, so-called MCBs. However, the relevant automatic AC circuit breaker can also be designed as a hybrid switching device. It has been shown that the short-circuit release of such automatic AC circuit breakers is tripped by the resonant circuit current generated upon disconnection and that such automatic AC circuit breakers even disconnect without additional actuation.

According to a second preferred embodiment of the first isolating relay 7, it is provided that the first isolating relay 7 is designed as a remote trippable AC switch, a trip input of the first isolating relay 7 being connected to the control and monitoring unit 15. In this case, it can also be provided that a first isolating relay 7 in the form of an automatic AC circuit breaker is likewise designed to be remotely trippable and provided with a trip input.

The control and monitoring unit 15 is preferably designed to determine a time of a zero crossing of the current of the oscillation after the resonant circuit begins to oscillate and subsequently to output a disconnection pulse to the first isolating relay 7 to open the first isolating relay 7 in a predeterminable time range around the determined time of the zero crossing.

As a result, the switching contacts of the first isolating relay 7 can be opened when the load on the switching contacts is very low. The bandwidth of the switches or relays, which are suitable for use as the first isolating relay 7, can thereby be increased significantly. Even though an AC-MCB is capable of interrupting a high alternating current at any time and quenching the resulting AC switch arc, this is not the case for conventional relays, which are intended to switch operating currents. By deliberately disconnecting at a certain time at which a small current is expected, in particular at the shortest possible time before the zero crossing, it is also possible to use relays that are per se designed only for switching during operation.

The time of the zero crossing of the current of the oscillation can be determined in various ways. According to one embodiment, it is further provided that the subject-matter installation is trained during its installation on the basis of a plurality of test faults or test releases. As a result, the control and monitoring unit 15 already "knows" the anticipated magnitude of the frequency of the oscillation upon shutdown. In the case of a disconnection occurring during subsequent operation, the gradient of the current rise is then determined. The gradient and the previous training can then be used to quite precisely determine the frequency or period of the oscillation in question or the expected time of the first zero crossing very easily and with little computational effort.

In this case, provision is made in particular for the further actual current curve to be measured, in particular up to the first inflection point and for this current curve, in particular the time of the first inflection point, to be taken into account when determining the time of the first zero crossing. Furthermore, the data determined here is also used to adjust the settings stored in the control and monitoring unit 15 after the training.

The subject-matter arrangement can be designed entirely with individual components. However, it can also be provided that at least two components, in particular all the components are arranged as an integrated unit in a common housing.

As a result, a compact design is achieved and wiring errors can be avoided.

Therefore, if a DC short circuit occurs, the subject-matter installation carries out a method in which it is provided that the short-circuit current is detected by the first current sensor 6, the AC circuit breaker 1 being switched off in a first step such that a resonant circuit consisting of the smoothing capacitor 4 and an inductance of the DC network connected to the first DC output 12, 28 is excited so as to oscillate, the first isolating relay 7 subsequently being opened.

If a first semiconductor switch 5 is arranged at the described location in the relevant installation, it is provided that a short-circuit current is detected by the first current sensor 6 in the method, the first semiconductor switch 5 and the AC circuit breaker 1 being switched off in a first step such that a resonant circuit consisting of the smoothing capacitor 4 and an inductance of the DC network connected to the first DC output 12, 28 is excited so as to oscillate, the first isolating relay 7 subsequently being opened.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An electrical AC/DC converter arrangement, comprising:
    an AC circuit breaker;
    a rectifier;
    at least one smoothing capacitor;
    at least one first isolating relay for electrical isolation;
    at least one first current sensor; and
    a control and monitoring unit,
    wherein an input of the AC circuit breaker forms an AC input of the arrangement,
    wherein an output of the AC circuit breaker is connected, at least indirectly by a first circuit, to an input of the rectifier,
    wherein the at least one smoothing capacitor connects a first output of the rectifier to a second output of the rectifier,
    wherein the first output of the rectifier is connected, at least indirectly by a second circuit, to an input of the at least one first isolating relay,
    wherein an output of the at least one first isolating relay forms a first DC output of the arrangement and connects a DC network to at least one first DC load,
    wherein the at least one first current sensor is arranged between the at least one smoothing capacitor and the at least one first isolating relay,
    wherein the AC circuit breaker, the at least one first current sensor, and the at least one first isolating relay are connected to the control and monitoring unit, and
    wherein the control and monitoring unit is configured to initiate a separation of the AC input from the DC output in a first step upon detection of a short-circuit current such that a resonant circuit comprising the at least one smoothing capacitor and an inductance of the DC network connected to the first DC output is excited so as to oscillate, the at least one first isolating relay subsequently being opened.

2. The electrical AC/DC converter arrangement of claim 1, wherein the AC circuit breaker comprises a hybrid circuit breaker or a semiconductor circuit breaker, and
    wherein the control and monitoring unit for separating the AC input from the DC output is configured to trip the AC circuit breaker.

3. The electrical AC/DC converter arrangement of claim 1, further comprising:
    a first semiconductor switch arranged between the first output of the rectifier and the at least one smoothing capacitor, and
    wherein the control and monitoring unit for separating the AC input from the DC output is configured to disconnect the first semiconductor switch.

4. The electrical AC/DC converter arrangement of claim 1, wherein the at least one first isolating relay comprises an automatic AC circuit breaker.

5. The electrical AC/DC converter arrangement of claim 1, wherein the at least one first isolating relay comprises a remotely trippable AC switch, a trip input of the at least one first isolating relay being connected to the control and monitoring unit.

6. The electrical AC/DC converter arrangement of claim 1, wherein the control and monitoring unit is configured to determine a time of a zero crossing of a current of an oscillation after the resonant circuit begins to oscillate and subsequently to output a disconnection pulse to the at least one first isolating relay to open the at least one first isolating relay in a predeterminable time range around the determined time of the zero crossing.

7. The electrical AC/DC converter arrangement of claim 1, wherein at least two components of the electrical AC/DC converter arrangement are arranged as an integrated unit in a common housing.

8. A method of disconnecting an electrical AC/DC converter arrangement when a DC short circuit occurs, the electrical AC/DC converter arrangement comprising: an AC circuit breaker; a rectifier; at least one smoothing capacitor; at least one first isolating relay for electrical isolation; at least one first current sensor; and a control and monitoring unit, an input of the AC circuit breaker forming an AC input of the arrangement, an output of the AC circuit breaker being connected, at least indirectly by a first circuit, to an input of the rectifier, the at least one smoothing capacitor connecting a first output of the rectifier to a second output of the rectifier, the first output of the rectifier being connected, at least indirectly by a second circuit, to an input of the at least one first isolating relay, an output of the at least one first isolating relay forming a first DC output of the arrangement and connecting a DC network to at least one first DC load, the at least one first current sensor being arranged between the at least one smoothing capacitor and the at least one first isolating relay, the AC circuit breaker, the at least one first current sensor, and the at least one first isolating relay being connected to the control and monitoring unit, and the control and monitoring unit being configured to initiate the disconnecting of the AC input from the DC output in a first step upon detection of the short-circuit current such that a resonant circuit comprising the at least one smoothing capacitor and an inductance of the DC network connected to the first DC output is excited so as to oscillate, and to subsequently open the at least one first isolating relay, the method comprising:
    detecting the short-circuit current by the at least one first current sensor;
    switching off the AC circuit breaker in the first step so as to excite the resonant circuit so as to oscillate the resonant circuit; and
    subsequently opening the at least one first isolating relay.

9. A method of disconnecting an electrical AC/DC converter arrangement when a DC short circuit occurs, the electrical AC/DC converter arrangement comprising: an AC circuit breaker; a rectifier; at least one smoothing capacitor; at least one first isolating relay for electrical isolation; at least one first current sensor; a first semiconductor switch arranged between the first output of the rectifier and the at least one smoothing capacitor; and a control and monitoring unit, an input of the AC circuit breaker forming an AC input of the arrangement, an output of the AC circuit breaker being connected, at least indirectly by a first circuit, to an input of the rectifier, the at least one smoothing capacitor connecting a first output of the rectifier to a second output of the rectifier, the first output of the rectifier being connected, at least indirectly by a second circuit, to an input of the at least one first isolating relay, an output of the at least one first isolating relay forming a first DC output of the arrangement and connecting a DC network to at least one first DC load, the at least one first current sensor being arranged between the at least one smoothing capacitor and the at least one first isolating relay, the AC circuit breaker, the at least one first current sensor, and the at least one first isolating relay being connected to the control and monitoring unit, and the control and monitoring unit being configured to initiate the disconnecting of the AC input from the DC output in a first step upon detection of the short-circuit current such that a resonant circuit comprising the at least one smoothing capacitor and an inductance of the DC network connected to the first DC output is excited so as to oscillate, configured to subsequently open the at least one first isolating relay, and, for separating the AC input from the DC output, configured to disconnect the first semiconductor switch, the method comprising:

detecting the short-circuit current by the at least one first current sensor;

switching off the first semiconductor switch in the first step so as to excite the resonant circuit so as to oscillate the resonant circuit;

subsequently opening the at least one first isolating relay.

10. The electrical AC/DC converter arrangement of claim 4, wherein the automatic AC circuit breaker comprises an electromechanical automatic AC circuit breaker comprising a short-circuit release.

11. The electrical AC/DC converter arrangement of claim 7, wherein all components of the electrical AC/DC converter arrangement are arranged as the integrated unit in the common housing.

\* \* \* \* \*